United States Patent Office 3,718,541
Patented Feb. 27, 1973

3,718,541
ISOLATION OF PROTEINS
Vladimir Kalina, Lausanne, Switzerland, assignor to Societe d'Assistance Technique Pour Produits Nestle S.A., Lausanne, Switzerland
No Drawing. Filed July 16, 1970, Ser. No. 62,766
Claims priority, application Great Britain, Aug. 28, 1969, 42,795/69
Int. Cl. C12b 1/00
U.S. Cl. 195—28 R          8 Claims

ABSTRACT OF THE DISCLOSURE

A protein isolate is obtained from bacterial cells by subjecting the cells to an alkaline shock of short duration which is followed by degradation with an acid. Other features of the invention are disclosed in the specification.

This invention is concerned with a process for isolating bacterial proteins.

A particular problem in the utilisation of microorganism cells as a food is the extraction of proteins from the cells. Cell rupture by physical methods, used for the recovery of active enzymes, is impractical on an industrial scale. Enzymatic methods are generally uneconomical and frequently lead to degraded proteins of low molecular weight and with low overall yields. Chemical extraction procedures which have been proposed require complex treatments and high concentrations of extraction agents which again tend to yield a degraded product of poor nutritional value.

A further factor to be considered in the production of microbial proteins is the choice of suitable microorganisms. Apart from considerations relating to substrate utilisation, maximum growth rates and feasibility of continuous culture, the fact that interest has been focussed on yeasts reflects the existence of established industries supplying large quantities of yeast protein material for the enrichment of animal fodder. For the production of proteins for human consumption gram-positive bacteria have apparently been preferred because of their freedom from endotoxin. Regardless of these considerations, the isolation of foodgrade proteins from microorganisms also involves problems with the elimination of undesirable cell constituents, especially purine bases and growth-depressing factors.

It is an object of the present invention to provide a simple procedure for isolating bacterial protein.

This invention accordingly provides a process for producing protein isolate by liberating protein from bacterial biomass which comprises subjecting the biomass to an alkaline shock of short duration, at an alkali concentration of 0.1 N to 2 N, to release the cytoplasmic content thereof, thereafter adding an acid to obtain a free acid concentration of 0.1 N to 2 N, maintaining acid conditions for a period of time sufficient to obtain degradation and solubilisation of undesirable cell constituents and recovering the liberated cell protein.

In carrying out the process herein defined, the starting material is a fermentation broth obtained by aerobic culture of a bacterium on a nutrient medium containing carbon and nitrogen sources and conventional additives such as mineral salts, vitamins, growth promoters and the like. The carbon source may be a paraffin hydrocarbon (linear or cyclic), an oxygenated hydrocarbon such as ethanol or a carbohydrate. The fermentation broth, withdrawn from the fermenter and containing the biomass, usually has a cell dry matter content of about 1 to 2% by weight. This content may, however, under certain conditions, reach up to about 4%. It may, with advantage, be first concentrated, for example by evaporation or centrifugation, to a dry cell matter content of 7 to 15%. To the broth, optionally after concentration, is added an alkali in a quantity sufficient to give a concentration in the range 0.1 N to 2 N. As a practical matter, concentrations outside this range are preferably avoided since they do not offer any particular advantages over the specified range. The alkali, which is preferably sodium or potassium hydroxide, may conveniently be added in the form of a concentrated solution. Other alkaline substances such as ammonia and alkaline earth metal oxides or hydroxides could also be used but sodium or potassium hydroxide is the alkali of choice. The treatment of the biomass with alkali should take place in a manner such that rapid contact is obtained. This may, for example, be secured by vigorous agitation or by contacting thin layers of broth and alkali solution. As indicated, the object of this treatment is to cause liberation of the cytoplasmic substances present within the cell walls, and with homogeneous distribution of alkali this effect is achieved within a matter of minutes. Such a short treatment, preferably not exceeding 10 minutes, avoids degradation of the protein.

The alkali treatment is immediately followed by addition of an acid which first arrests the action of alkali on the biomass and subsequently leads to solubilisation of various undesirable materials present within the cells, especially the purine bases and growth-retarding factors. The treatment in acid medium is preferably effected at an elevated temperature such as between 50 and 100° C., and desirably with agitation. The acid may be any strong acid, for example sulphuric acid, hydrochloric acid or phosphoric acid, and the amount added should provide a concentration of 0.1 to 2 N. As with the alkali, no particular advantages accrue from using concentrations outside this range. The duration of acid treatment should be sufficient to ensure degradation and solubilisation of the undesirable substances present in the biomass and will depend on the temperature at which the treatment is carried out.

During, or after, the acid treatment it is advantageous to add a further acid having reducing and/or chelating properties. Examples of such acids are tartaric acid, acetic acid, citric acid and ascorbic acid, and their effect is to inhibit oxidation of pigments present in the biomass to dark-coloured compounds, and acids also having chelating properties prevent absorption of pigments by the protein, thereby avoiding discoloured products.

The isolation of the liberated protein may be carried out by any convenient method. However, since the supernatant contains the solubilised undesirable substances, the preferred technique for recovering the protein is isoelectric precipitation, at a pH corresponding to the isoelectric point of the protein present. This, of course, will vary with different bacteria, but is usually between pH 3 and 5. Isoelectric precipitation per se is a well known technique and therefore need not be described here in detail. It should, however, be observed that isoelectric precipitation in conjunction with the process of the present invention provides a protein of superior quality, since it is precipitated from a medium which prior to adjustment to the isoelectric point was acidic rather than basic. If desired, the reducing and/or chelating organic acid may be added at this stage of the process.

The precipitated protein may be recovered by centrifugation, filtration or decantation. Thereafter it may be washed and dried, as by spray-, freeze- or roller-drying, thus obtaining a powder. The dried product is a white powder having a neutral taste. It is easily assimilated and constitutes an excellent source of protein for human and animal consumption.

The process described herein may be applied to any bacterium, irrespective of the substrate on which it was grown. It may be used for isolating protein both from gram-negative as well as gram-positive bacteria, but it is especially suitable for treating gram-negative strains. Examples of genera of bacteria for which the process of the invention is particularly useful are Micrococcus, Pseudomonas, Alcaligenes and Arthrobacter. It should be understood, however, that the invention resides in a general method of isolating protein from a biomass, rather than in a method of treating a specific bacterial strain.

The following examples, in which the percentages are by weight, are given only for the purpose of illustrating the invention.

EXAMPLE 1

200 ml. of 20% potassium hydroxide solution are rapidly added to 5 litres of a vigorously stirred suspension of *Micrococcus Cerificans* (ATCC 14987) cells containing 425 g. of biomass (dry cell basis) which had been grown in a medium containing $C_{12}$ to $C_{18}$ linear paraffins as carbon source. The cell suspension is obtained by centrifuging native fermentation broth.

After several minutes' agitation, the suspension is acidified by addition of 500 ml. of 20% hydrochloric acid thus giving an acid concentration of 0.3 N. 12 g. of citric acid are also added and the suspension is stirred at 60° C. for three hours.

The pH of the suspension is then adjusted to 3.5 by addition of 20% potassium hydroxide solution and the precipitated protein is separated from the supernatant by centrifugation. The protein mass is washed by suspension in 5 litres of water, the pH is raised to 7.5 and the protein is reprecipitated at pH 3.5. The protein is recovered by centrifugation and freeze-dried, yielding 250 g. of dry product containing 12.8% of protein nitrogen. The product is a white powder having a neutral taste. It is easily assimilable and may be formulated in various high protein food compositions.

EXAMPLE 2

200 ml. of 20% sodium hydroxide solution are rapidly added to 5 litres of a vigorously stirred suspension of Alcaligenes sp (ATCC 15525) cells containing 350 g. of biomass (dry cell basis) which had been grown in a medium containing ethanol as carbon source. The cell suspension is obtained by evaporating native fermentation broth, and it is heated to 50° C. when the alkali is added.

After stirring for one minute the suspension is acidified with 300 ml. of 40% orthophosphoric acid which gives an acid concentration of 0.4 N. 25 g. of tartaric acid are also added and the suspension is maintained at 90° C. for 1 hour. Thereafter the suspension is cooled and the protein is precipitated by adjusting the pH to 4.5 with sodium hydroxide solution.

The precipitated protein is separated by centrifugation. The recovered protein is washed by suspension in 5 litres of water, centrifuged and freeze-dried. 210 g. of a white powder, having a neutral taste and containing 12.1% protein nitrogen are obtained.

The product, which is easily assimilated, may be formulated in various high protein food compositions.

EXAMPLE 3

The procedure described in Example 2 is repeated, except that no tartaric acid is added. The dry product, although showing slight discolouration, is otherwise identical with the product of Example 2.

EXAMPLE 4

The procedure of Example 1 is repeated except that the citric acid is replaced by 15 g. of ascorbic acid. The dried product is indistinguishable from the product of Example 1.

Whilst the protein isolate disclosed herein is eminently suitable for use as a food supplement for human consumption, it may also be spun by conventional techniques in the form of fibres, or be otherwise shaped, to provide novel food products. Alternatively, the isolate may be used as a protein source in the production of synthetic resins, glues and like materials.

We claim:

1. A process for producing protein isolate by liberating protein from a cellular gram-negative bacterial biomass which comprises,
   (A) rupturing the cell walls of said biomass by subjecting it to an alkaline concentration of about 0.1 N to 2 N for a period not exceeding 10 minutes, to release the cytoplasmic content thereof; thereafter
   (B) adding an acid to obtain a free acid concentration of about 0.1 N to 1 N, maintaining an acidic condition for a period of time sufficient to obtain degradation and solubilisation of undesirable cell constituents; and
   (C) recovering liberated cell protein from said undesirable cell constituents.

2. A process according to claim 1, in which the bacterial biomass contains 7 to 15% by weight of cell dry matter.

3. A process according to claim 1, in which the treatment with an acid is effected at a temperature of 50 to 100° C.

4. A process according to claim 1, in which an acid having reducing and/or chelating properties is also added during step B, in order to inhibit oxidation and/or prevent absorption of pigments.

5. A process according to claim 1, in which the recovered cell protein is dried to a powder.

6. A process according to claim 1, in which the alkali of step A is selected from the group consisting of sodium hydroxide and potassium hydroxide.

7. A process according to claim 1, in which protein is recovered by means of isoelectric precipitation.

8. A process according to claim 7, in which an acid having reducing and/or chelating properties is added during the isoelectric precipitation in order to inhibit the oxidation and/or prevent the absorption of pigments.

References Cited

UNITED STATES PATENTS 3,480,610  11/1969  Fox _____ 260—112 R
3,585,179   6/1971  Samejuna et al. _____ 195—28 X LIONEL M. SHAPIRO, Primary Examiner R. B. PENLAND, Assistant Examiner U.S. Cl. X.R.

260—112 R

PO-1050
(5/69)

UNITED STATES PATENT OFFICE
CERTIFICATE OF CORRECTION

Patent No. 3,718,541      Dated  Feb. 27, 1973

Inventor(s)  Vladimir Kalina

It is certified that error appears in the above-identified patent and that said Letters Patent are hereby corrected as shown below:

Claim 1, line 9 thereof.   "0.1 N to 1 N" should be --0.1 N to 2 N--

Signed and sealed this 29th day of April 1975.

(SEAL)
Attest:

RUTH C. MASON
Attesting Officer

C. MARSHALL DANN
Commissioner of Patents
and Trademarks